United States Patent
Yabuki

[11] Patent Number: 5,948,186
[45] Date of Patent: Sep. 7, 1999

[54] LIGHT WEIGHT TIRE INCLUDING POLYBENZAZOLE FIBERS

[75] Inventor: Kazuyuki Yabuki, Shiga, Japan

[73] Assignee: Toyobo Co., Ltd., Japan

[21] Appl. No.: 08/491,832

[22] PCT Filed: Feb. 8, 1994

[86] PCT No.: PCT/US94/01404

§ 371 Date: Jul. 10, 1995

§ 102(e) Date: Jul. 10, 1995

[87] PCT Pub. No.: WO94/18015

PCT Pub. Date: Aug. 18, 1994

[30] Foreign Application Priority Data

Feb. 9, 1993 [JP] Japan ................................ 5-21210

[51] Int. Cl.$^6$ .............................. B60C 9/02; B60C 9/18; C08G 73/06; C08G 73/22

[52] U.S. Cl. .................. 152/527; 152/451; 152/556; 428/364; 428/401; 528/183; 528/337; 528/424

[58] Field of Search .................... 152/451, 527, 152/556; 528/422–425, 183, 337; 428/1, 364, 401

[56] References Cited

U.S. PATENT DOCUMENTS

| | | | |
|---|---|---|---|
| 4,533,692 | 8/1985 | Wolfe et al. | 528/183 X |
| 4,581,437 | 4/1986 | Mammone | 528/183 |
| 4,606,875 | 8/1986 | Chenevey et al. | 528/183 X |
| 5,001,217 | 3/1991 | Tsai et al. | 528/183 X |
| 5,100,434 | 3/1992 | Sweeny | 528/481 X |
| 5,233,821 | 8/1993 | Weber, Jr. et al. | . |
| 5,286,833 | 2/1994 | Bubeck et al. | . |
| 5,288,452 | 2/1994 | Yabuki | . |
| 5,294,390 | 3/1994 | Rosenberg et al. | . |
| 5,296,185 | 3/1994 | Chau et al. | . |
| 5,427,165 | 6/1995 | Balestra et al. | 152/451 X |

FOREIGN PATENT DOCUMENTS

| | | | |
|---|---|---|---|
| 6128015 | 2/1986 | Japan | 152/451 |
| 63145414 | 6/1988 | Japan | 152/451 |

OTHER PUBLICATIONS

Derwent Abstract, 88–209197, "Modified poly–para–phenylene benzo:bis:thiazole fibre—used for mfg. tyre cord and reinforcing material for engineering plastics," JP63145414 (1988).

*Primary Examiner*—Adrienne C. Johnstone
*Attorney, Agent, or Firm*—Morrison & Foerster, LLP

[57] ABSTRACT

A tire includes polybenzazole (PBZ) fibers, preferably either polybenzoxazole (PBO) or polybenzothiazole (PBT) fibers which are liquid-crystalline. The PBZ fibers can be incorporated into either the carcass of the tire, the reinforcing belts, or both. Preferably the PBZ fibers have a) a tensile strength of at least 4.0 GPa; b) a tensile modulus of at least 140 GPa; and c) an average void diameter of 25 Å or less.

4 Claims, No Drawings

LIGHT WEIGHT TIRE INCLUDING POLYBENZAZOLE FIBERS

BACKGROUND OF THE INVENTION

The present invention relates to light weight tires.

A tire is defined as a "continuous solid or pneumatic rubber cushion encircling a wheel," p. 1237, Webster's Ninth New Collegiate Dictionary,© 1989 by Merriam-Webster Inc. A tire is made from rubber, fabric, chemicals, and metal (steel). See Tires, pp. 834–861, of Vol. 16 of the Encyclopedia of Polymer Science and Engineering, © 1989 by John Wiley & Sons, Inc. A pneumatic tire is a toroidal, high performance polymer composite which includes an external rubber-and-fabric covering. In these tires there are reinforcing cords which provide stability and resistance to bruises, fatigue and heat.

In bias-ply tires, the reinforcing cords extend diagonally across the tire from bead-to-bead. Layers of reinforcing cords are applied at an opposing angle of 30 to 70 degrees to balance the tire strength symmetrically across the tread-center line.

A radial tire is a pneumatic tire in which the plies of the reinforcing cords or filaments in the casing run in a radial direction (from bead-to-bead) at a 60 to 90 degree bias or crown angle in relation to the centerline of the tread (which is also the axis of rotation). Steel belts are used in radial tires in order to constrain the 90 degree carcass plies. The belt rigidity is essential to the functioning of the tire. Without it, a radial ply casing would be unstable. In addition to the steel belts, polyester cords and/or steel cords are used in the foundation structure or "carcass" (the carcass is that part of the tire between the liner and the tread) of the tire to reinforce the performance of the tire as a pressure container.

When steel reinforcement is used in construction of tires, the driving performance of the tires improves; however, the weight of the tires increases due to the weight of the steel. The extra weight of the steel reinforced tires means that vehicles that use steel reinforced tires have an increased "rolling resistance" which leads to an increase in fuel consumption. It is a desirable goal to decrease the amount of fuel consumption in all vehicles for efficiency, cost and environmental reasons.

It has been tried previously to substitute high performance organic fibers for steel in tires; however, these known organic fibers, such as p-aramid fibers, are not used in large quantities for this use because of performance problems. These performance problems include: a lack of sufficient tensile properties in the fibers such that in order to get an equivalent performance from a tire using organic fibers instead of steel, so much of the organic fiber has to be used that the weight of the tire is comparable to the weight the tire had when steel was used. Also, it has been found that the abrasion resistance and fatigue resistance of tires made with known organic fibers is not adequate for these tires to perform to desired levels.

It is desirable to produce tires that have equivalent performance to tires made with steel, but that weigh measurably less than do tires made with steel.

SUMMARY OF THE INVENTION

The first aspect of this invention is a tire characterized in that it contains polybenzazole fibers.

The second aspect of this invention is a tire containing polybenzazole fibers characterized in that the polybenzazole fibers have:

a) a tensile strength of at least 4.0 GPa;

b) a tensile modulus of at least 140 GPa; and c) an average void diameter of 25 Å or less.

The third aspect of this invention is a tire containing polybenzazole fibers characterized in that the polybenzazole fibers are incorporated into the reinforcing belts.

The fourth aspect of this invention is a tire containing polybenzazole fibers characterized in that the polybenzazole fibers are incorporated into the carcass of the tire.

DESCRIPTION OF THE PREFERRED EMBODIMENTS

Making the Polybenzazole Polymers

As used herein, the term polybenzazole ("PBZ") includes polybenzoxazole ("PBO") homopolymers, polybenzothiazole ("PBT") homopolymers and random, sequential and block copolymers of PBO and/or PBT. Polybenzoxazole, polybenzothiazole and random, sequential and block copolymers of polybenzoxazole and polybenzothiazole are described in references such as Wolfe et al., Liquid Crystalline Polymer Compositions, Process and Products, U.S. Pat. No. 4,703,103 (Oct. 27, 1987); Wolfe et al., Liquid Crystalline Polymer Compositions, Process and Products, U.S. Pat. No. 4,533,692 (Aug. 6, 1985); Wolfe et al., Liquid Crystalline Poly(2,6-Benzothiazole) Compositions, Process and Products, U.S. Pat. No. 4,533,724 (Aug. 6, 1985); Wolfe, Liquid Crystalline Polymer Compositions, Process and Products, U.S. Pat. No. 4,533,693 (Aug. 6, 1985); Evers, Thermooxidatively Stable Articulated p-Benzobisoxazole and p-Benzobisthiazole Polymers, U.S. Pat. No. 4,359,567 (Nov. 16, 1982); and Tsai et al., Method for Making Heterocyclic Block Copolymer, U.S. Pat. No. 4,578,432 (Mar. 25, 1986).

Units within the polybenzazole polymer are preferably chosen so that the polymer is lyotropic liquid-crystalline. Preferred monomer units are illustrated in Formulae (a)–(h). The polymer more preferably consists essentially of monomer units selected from those illustrated in (a)–(h), and most preferably consists essentially of a number of identical units selected from those illustrated in (a)–(c).

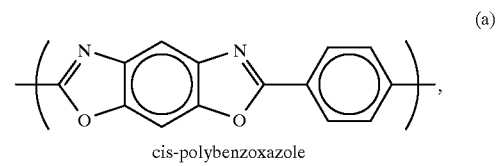

(a)

cis-polybenzoxazole
Poly[benzo(1, 2-d:5, 4-d')bisoxazole-2, 6-diyl-1, 4-phenylene]

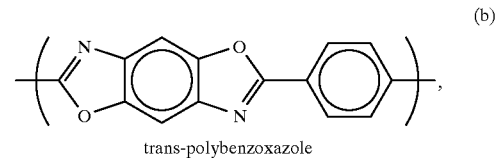

(b)

trans-polybenzoxazole
Poly[benzo(1, 2-d:4, 5-d')bisoxazole-2, 6-diyl-1, 4-phenylene]

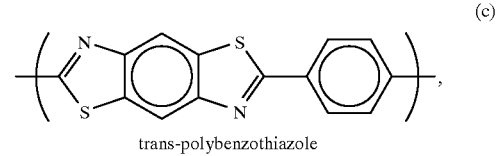

(c)

trans-polybenzothiazole

-continued

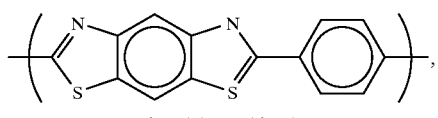
cis-polybenzothiazole

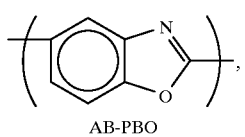
AB-PBO
Poly(2, 5-benzoxazole)

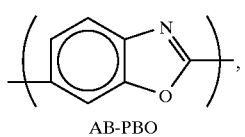
AB-PBO
Poly(2, 6-benzoxazole)

, and
Poly(2, 5-benzothiazole)

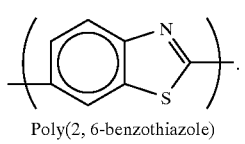
Poly(2, 6-benzothiazole)

Solvents suitable for formation of dopes of polybenzazole polymers include cresol as well as non-oxidizing acids capable of dissolving the polymer. Examples of suitable acid solvents include polyphosphoric acid, methanesulfonic acid and highly concentrated sulfuric acid and mixtures of those acids. A highly preferred solvent is polyphosphoric acid or methanesulfonic acid. A most highly preferred solvent is polyphosphoric acid. The concentration of the polymer in the solvent is preferably at least about 7 weight percent, more preferably at least about 10 weight percent and most preferably at least about 14 weight percent. The maximum concentration is limited primarily by practical factors, such as polymer solubility and, as already described, dope viscosity. Because of these limiting factors, the concentration of polymer is seldom more than 30 weight percent, and usually no more than about 20 weight percent.

Suitable polymers or copolymers and dopes can be synthesized by known procedures, such as those described in Wolfe et al., U.S. Pat. No. 4,533,693 (Aug. 6, 1985); Sybert et al., U.S. Pat. No. 4,772,678 (Sep. 20, 1988); and Harris, U.S. Pat. No. 4,847,350 (Jul. 11, 1989). Polybenzazole polymers can be advanced rapidly to high molecular weight at relatively high temperatures and high shear in a dehydrating solvent acid, according to Gregory et al., U.S. Pat. No. 5,089,591.

Making The Fibers

The dope is spun into fibers by known dry-jet, wet-spin techniques in which the dope is spun through a spinneret to form dope filaments that are collected together to form one or more dope fibers. Fiber spinning techniques for PBZ polymers are described in U.S. Pat. No. 5,296,185 (Method for Spinning a Polybenzazole Fiber) and U.S. Pat. No. 5,294,390 (Method for Rapid Spinning of a Polybenzazole Fiber).

After passing through an air-gap the dope fiber(s) is/are contacted with a fluid that dilutes the solvent and is a non-solvent for the polymer. This contact causes the separation of the polymer from its solvent. This separation process is known as coagulation. After coagulation, most of the remaining residual solvent is washed/leached from each fiber, leaving the fiber wet. See U.S. Pat. No. 5,393,478 (Improved Process for Coagulation and Washing of Polybenzazole Fibers) for a description of the coagulation process.

The wet fibers are then dried. Drying of the fibers is described in U.S. Pat. No. 5,429,787 entitled "Method For Rapid Drying of a Polybenzazole Fiber."

After the fiber is dried, it may optionally be heat-treated to improve its physical properties. Heat-treatment of PBZ fiber is described in U.S. Pat. No. 5,288,445 (Rapid Heat Treatment Method for Polybenzazole Polymer) and U.S. Pat. No. 5,288,452 (Steam Heat-Treatment Method for Polybenzazole Fiber).

Use of PBZ Fibers in Tires

Two major reinforcing components of tires are the carcass and the reinforcing belts. PBZ reinforcing fibers can be used as part of the carcass component of a tire. The carcass of a tire is that part of the tire between the liner and the tread, which is also referred to as the foundation structure, and it includes the reinforcing cord plies. PBZ fibers can also be used in the circumferentially restrictive belt material of a tire.

In order to be useful in tires, PBZ fibers must be formed into cords through a twisting process. See the article by Addis Finney, entitled, "That Left-hand Turn and its Effect on Tires" in the May 1979 issue of Rubber World, for a description and drawing of ply cords and cables. PBZ fibers are formed into ply cords by twisting. "T/10 cm" is the number of twists per 10 cm of cord. Once PBZ ply cords have been formed, two or more of these ply cords can then be twisted together to make cable cords. The twist number for these cable cords is expressed by the number of cable twists (turns/10 cm)×the number of ply twists (turns/10 cm). For PBZ cords and cables in this application the twist number can vary from 20×20 to 100×100. The twist factor for PBZ cords is calculated as follows: twist factor equals (number of twists/10 cm)×square root of (total denier of fiber/density of fiber). The twist factor for PBZ cords used in this application ranges from 800 to 3000. The PBZ ply cords, at this stage, are referred to as a greige cord, which is descriptive of the cords before dipping condition. These PBZ greige cords have a gauge, or thickness of from 0.30 mm to 0.60 mm.

In order to transform the greige cords into a condition such that they can be used to make layers of reinforcing material, or layers of belt material, the greige cords must be dipped in adhesives to form "dipped" cords and/or cables which will then adhere to the other components of a tire. These adhesives can be standard epoxy adhesives such as a glycerol polyglycidyl ether or compounds such as Pexul™ which is a 2,6-bis(2',4'-dihydroxyphenyl-methyl)-4-chlorophenol compound (this compound is also marketed under the name of Vulcanbond-E™ by Rhone-Poulenc) or RFL (resorcinol formaldehyde latexes). Other suitable adhesives can be substituted for these adhesives.

The actual dipping is a two-step process wherein the cords/cables are dipped in the first dipping solution, which can contain epoxy or Pexul™ as a major adhesive component, and then the cords/cables are exposed to a temperature of from 235° C. to 250° C. for about 60 seconds. The cords/cables are then contacted with the second dipping solution which can be RFL (resorcinol-formaldehyde latexes) and then exposed to a temperature of 230° C. to 240° C. for about 60 seconds.

Once the PBZ cords/cables have been formed they are incorporated into tires using standard tire making techniques with the tires then being tested for various properties.

Because of the higher (about 2 times) tensile strength and tensile modulus of polybenzazole fibers, carcass material for tires used in passenger cars of this invention can be a 2 ply cord of 500 (or less) denier PBZ fiber as compared to a 2 ply cord of 1000 denier p-aramid fiber. (Denier is the weight in grams of 9000 meters of the fiber.) For this reason, by using PBZ tire cord the cord gauge can be reduced to 0.39 mm or less as compared to the 0.67 mm gauge required for conventional 1500 denier 2 ply polyester cord used in the carcass.

As a result, it is possible to reduce the weight of such a tire by substituting PBZ for organic fibers and steel in both the carcass and the belts. As an example of this weight reduction, for a standard 195/65R15 tire (a "195/65R15" tire designation is based on JIS D4202-1982 and is interpreted as follows—the width of the tire is 195 mm, the aspect ratio of the tire is 65 percent, "R" means a radial tire and the tire rim is 15 inches), it is possible to drop 1.5 kgs of weight in the tire by using PBZ cords. This weight reduction is calculated as follows:

500 grams of weight reduction by using PBZ cords in the carcass;
600 grams of weight reduction by using PBZ cords in place of steel in the belts; and
400 additional grams of weight reduction in the carcass because of a reduction in thickness of the rubber in the carcass; this is because less rubber is required in the carcass when PBZ cords are used in the carcass.

It has been found that the performance properties of the cords in the tire are enhanced if the PBZ fiber used to make the cords has a tensile strength of preferably at least about 2.8 GPa, more preferably at least about 4.0 GPa, more highly preferably at least about 5.7 GPa and most preferably about 6.9 GPa, and a tensile modulus of preferably at least about 140 GPa, more preferably at least about 276 GPa and most preferably at least about 380 GPa.

It has also been found that fatigue resistance properties of the PBZ fiber used in tire cords is better if the average mean diameter of voids in the fiber is 25 Å or less. The average mean diameter of the voids in the PBZ fiber can be determined by using "Small angle X-ray scattering" techniques which can measure voids in the fiber of smaller than 100 Å. A tire made with PBZ cord in the carcass which has voids with an average diameter of 25 Å or less, has been found to have two times higher durability as compared with the same tire when it is made with PBZ cords that have an average void size of 30 Å or more.

It is a feature of this invention that passenger car tires could be made that had only PBZ cords in the belts and in the carcass (these would be the lightest tires) and that passenger car tires could be made with steel belts and with PBZ cords in the carcass (these tires would be heavier than tires made with only PBZ cords) and that passenger car tires could be made with PBZ cords in the belts and polyester cords in the carcass (these tires would be less expensive than the other tires).

It is a feature of this invention that truck/bus tires could be made that had only PBZ cords in the belts and in the carcass (these would be the lightest tires) and that truck/bus tires could be made with steel belts and with PBZ cords in the carcass (these tires would be heavier than tires made with only PBZ cords) and that truck/bus tires could be made with PBZ cords in the belts and steel in the carcass (these tires would be heavier than tires made with only PBZ cords).

The following examples are for illustrative purposes only. They should not be taken as limiting the scope of either the specification or the claims. Unless stated otherwise, all parts and percentages are by weight.

These are the measuring techniques used in these examples.

Diameter of a Void

Measurement of small angle X-rays scattering intensity is performed using suitable X-ray equipment such as a Kratkey camera. About 6 m of sample fiber is wound around a measurement holder, and X-rays are generated under the condition of 45 kv and 150 mA. A CuKa line filtered with a nickel filter is used for measurement.

The collimating slit of a Kratkey camera is 42 mm (length)×0.14 mm (width) and the receiving slit is 10 mm (length)×0.14 mm (width).

An equatorial scattering of fiber sample is measured from 0.1 degrees to 3 degree with 0.25 degrees of step width for 30 seconds or more of integration. Compensation of background scattering is performed using the following formula from the result of measurement of a sample and air scattering.

$$I = \mu I_{sample} - I_{air}$$

$$\text{Where } \mu = \frac{I_{air}(o)}{I_{sample}(o)}$$

Where I is an actual intensity, $I_{sample}$ is the intensity measured with a measuring sample, $I_{air}$ is the intensity measured without sample. After sample measurement, the intensity at scattering angle of 0 is measured in order to determine the absorption coefficient of a sample. The measurement of void size is determined by the use of a Guinier plot.

Self-square of scattering vector (k) versus logarithms of scattering intensity is plotted. The fitting of straight-line approximation in the range of $k^2$ from 0 to 0.01 $Å^{-2}$ is performed, and the average diameter of voids is calculated by the use of the following formula from slope of this straight line.

$$D = 2\sqrt{2k}$$

Dipped Cord Fatigue Testing

The disk fatigue test results are expressed in a percentage of strength retention and the tube fatigue test results are expressed in the number of minutes. The test protocol is based on JIS-L1017-1983.

Tire Testing

See ASTM F 538-91b and ASTM F 551-89 for background terminology and conditions for testing tires.

In-door drum test is used for high speed durability and load durability. The test protocol is based on JIS-D4230-1986.

The life-to-failure of tire is expressed as an index which is compared with 100 for passenger car tires (Table III) and with 100 for truck and bus tires (Table V).

Existence of breakage of carcass cord after running for a predetermined time is investigated and durability is expressed as an index which is compared with 100 for passenger car tires (Table III) and with 100 for truck or bus tires (Table V).

Rolling resistance is measured on an in-door drum tester and expressed as an index which is compared to 100 for passenger car tires (Table III), and with 100 for truck and bus tires (Table V). The index is an average value of the tests performed at a speed of from 20 to 150 km/h.

The riding feeling is based on a subjective evaluation of a panelist through actual driving of a vehicle on a test course. The riding feeling is expressed as an index which is compared with 100 for passenger car tires (Table III), and with 100 for truck and bus tires (Table V).

Fuel consumption is expressed as an index which is compared with 100 for passenger car tires (Table III) and 100 for truck and bus tires (Table V). The results show that fuel consumption for vehicles with tires with PBO fibers in them is better than it is for vehicles with tires that do not have PBO fibers.

High speed durability testing is done by applying a designed load to a tire using an in-door drum tester. The running speed is increased in a stepwise manner as follows:

80 Km/hr for 120 min.
120 Km/hr for 30 min.
130 Km/hr for 30 min.
140 Km/hr for 30 min.
150 Km/hr for 30 min.
until the failure is observed.

Load Durability

A constant running speed is applied to a tire using an in-door drum test. The load for the tire is increased with stepwise manner as follows:

Passenger tire
Speed=80 Km/h
Load
100% of max. load for 4 hrs.
110% of max. load for 6 hrs.
115% of max. load for 6 hrs.
until failure is observed.

Truck/Bus Tire
Speed=65 Km/h
Load
70% of max. load for 7 hrs.
90% of max. load for 16 hrs.
105% of max. load for 24 hrs.

Cornering Force

The lateral slippage force of a tire is measured on the drum tester under 2 degrees of slip angle at 10 km/h. Cornering Power is the cornering force divided by the slip angle. It is expressed as an index which is compared with 100 for passenger car tires (Table III) and 100 for truck and bus tires (Table V).

Carcass Pick Ends

This is the number of carcass cords per 10 cm.

Strength of Carcass Cord

This is the breaking strength of one carcass cord. It is measured by an Instron tensile tester.

EXAMPLE 1

Passenger Car Tires

Polyester, para-oriented aramid, and polybenzoxazole fiber were twisted, and 2 ply greige cords were made.

Two steps of dip processings were performed on each greige cord to make dipped cords/cables. Dip processing solutions and processing temperatures for the dipping process are shown in Table 1. The properties of the dipped cords obtained are shown in Table 2. There were five cords made with PBO, Examples A, B, C, D and E (Table II). There was one cord made with p-aramid, for comparison purposes in Table II. There is also one cord made of polyester for comparison purposes in Table II.

The fatigue tests of disk fatigue and tube fatigue, reported in Table II, shows that the fatigue resistance of PBO fiber is improved if the diameter of the voids in the PBO fiber is 25 Å or less as is the case in Samples A, B and C.

The strength coefficient is the value of a tensile strength divided by the square of the cord gauge. The higher this value means the more strength in the cord per unit of thickness. Therefore, this strength coefficient is an important measure of fiber properties for reduction of tire weight.

Tires for passenger cars are made using these dipped cords in the carcass and in the reinforcing belts, and the tire performance is tested. The composition of each tire and test results for each tire are shown in Table III.

TABLE I

|  | PBO | P-Aramid | Polyester |
|---|---|---|---|
| 1st Dipping Solution | Epoxy | Epoxy | Pexul |
| 1st Oven Temperature ° C. | 250 | 250 | 240 |
| 2nd Dipping Solution | RFL | RFL | RFL |
| 2nd Oven Temperature ° C. | 235 | 235 | 235 |

"Epoxy" is a glycerol polyglycidyl ether (trade name Denakol ™ marketed by Nagase)
"RFL" is a resorcinol-formaldehyde-latex
"Pexul ™" is a 2,6-Bis(2',4'-dihydroxyphenylmethyl)-4-chlorophenol product (also known as Vulcabond E ™, marketed by Rhone-Poulenc.) The dipping solutions are applied for 1 second and then dried for 60 seconds.

TABLE II

| Sample # | | A | B | C | D | E | F | G |
|---|---|---|---|---|---|---|---|---|
| Fiber Type | | PBO | PBO | PBO | PBO | PBO | P-Aramid | Polyester |
| Diameter of void, angstroms | | 20 | 20 | 25 | 30 | 34 | — | — |
| Denier | | 500 | 500 | 500 | 500 | 500 | 1000 | 1500 |
| Tensile Strength | GPa | 5.5 | 5.5 | 5.5 | 5.5 | 5.3 | 3.0 | 1.2 |
| Elongation @ Break | % | 2.0 | 3.8 | 3.9 | 3.8 | 3.7 | 4.3 | 13.8 |
| Tensile Modulus | GPa | 344.2 | 179.0 | 169.4 | 172.1 | 151.5 | 480.0 | 125.0 |
| Greige Cord | | | | | | | | |
| Twist | T/10 cm | 72 × 72 | 72 × 72 | 72 × 72 | 72 × 72 | 72 × 72 | 49 × 49 | 39.5 × 39.5 |
| Twist Factor | | 1823 | 1823 | 1823 | 1823 | 1823 | 1832 | 1835 |
| Cord Gauge | mm | 0.36 | 0.38 | 0.37 | 0.37 | 0.37 | 0.50 | 0.65 |

TABLE II-continued

| Sample # | | A | B | C | D | E | F | G |
|---|---|---|---|---|---|---|---|---|
| Strength | kg | 30.3 | 31.8 | 31.5 | 32.0 | 30.7 | 35.3 | 25.3 |
| Elongation @ Break | % | 4.9 | 5.4 | 5.3 | 5.3 | 5.2 | 6.6 | 18.2 |
| Dipped Cord | | | | | | | | |
| Twist | T/10 cm | 72 × 72 | 72 × 72 | 72 × 72 | 72 × 72 | 72 × 72 | 49 × 49 | 39.5 × 39.5 |
| Twist Factor | | 1823 | 1823 | 1823 | 1823 | 1823 | 1832 | 1835 |
| Cord Gauge | mm | 0.38 | 0.39 | 0.39 | 0.39 | 0.39 | 0.54 | 0.67 |
| Strength | kg | 27.2 | 25.8 | 26.0 | 25.7 | 24.3 | 28.5 | 23.8 |
| Strength Factor | kg/mm$^2$ | 188.4 | 169.3 | 170.9 | 169.0 | 159.8 | 97.7 | 53.0 |
| Load at 3% Elong. | kg | 20.6 | 18.1 | 17.8 | 18.0 | 17.9 | 17.0 | 16.9 |
| Elongation @ Break | % | 3.7 | 4.3 | 4.2 | 4.2 | 4.3 | 4.4 | |
| Hot Air Shrinkage | % | 0.0 | 0.0 | 0.0 | 0.0 | 0.0 | 0.0 | |
| Disk Fatigue | % | 53 | 61 | 59 | 40 | 23 | 56 | 63 |
| Tube Fatigue | min | 237 | 265 | 226 | 148 | 119 | 145 | 150 |

TABLE III

| Sample # | | Tire 1 | Tire 2 | Tire 3 | Tire 4 | Tire 5 | Comparative 1 | Comparative 2 |
|---|---|---|---|---|---|---|---|---|
| Belt Material | | A | B | C | D | E | F | Steel |
| Carcass Material | | A | B | C | D | E | F | G |
| Carcass Cord Pick Ends | /10 cm | 108 | 108 | 108 | 108 | 108 | 108 | 108 |
| Tire Weight | kg | 9.0 | 9.0 | 9.0 | 9.0 | 9.0 | 9.8 | 10.5 |
| Strength of Carcass Cord | kg | 26.5 | 25.8 | 26.0 | 25.3 | 23.9 | 25.3 | 22.5 |
| High Speed Durability | index | 110 | 108 | 105 | 96 | 92 | 98 | 100 |
| Load Durability | index | 102 | 102 | 102 | 97 | 89 | 97 | 100 |
| Rolling Resistance | index | 83 | 85 | 85 | 85 | 85 | 90 | 100 |
| Riding Feeling | index | 115 | 115 | 115 | 115 | 115 | 110 | 100 |
| Cornering Power | index | 100 | 98 | 98 | 98 | 98 | 97 | 100 |
| Fuel Consumption | index | 93 | 95 | 95 | 95 | 95 | 98 | 100 |

EXAMPLE 2

Truck and Bus Tires

Para-oriented aramid fiber and PBO fiber were twisted, and 2-ply greige cords made.

Each greige cord was dipped in the same manner as described and shown in Example 1, Table I to make dipped cords.

The properties of the dipped cords obtained are shown in Table IV.

A radial-ply tire for use on trucks or busses was made using these dipped PBO cords and/or steel cords, and the performance of these tires was tested.

The composition of the cords in each tire and the test results for the tires are shown in Table V.

TABLE IV

| Sample # | | H | I | J | K | L | M |
|---|---|---|---|---|---|---|---|
| Fiber Type | | PBO | PBO | P-Aramid | P-Aramid | Steel | Steel |
| Diameter of voids, angstroms | | 20 | 20 | — | — | — | — |
| Denier | | 1500 | 1500 | 3000 | 3000 | | |
| Tenacity | GPa | 5.5 | 5.5 | 3.0 | 3.0 | 2.3 | 2.3 |
| Elongation @ Break | % | 2.0 | 3.8 | 4.5 | 4.5 | 1.7 | 1.7 |
| Modulus | GPa | 344.2 | 179.0 | 68.8 | 68.8 | 194 | 194 |
| Greige Cord | | | | | | | |
| Twist | T/10 cm | 30 × 30 | 44 × 44 | 22 × 22 | 32 × 32 | 3 × 0.20 + 6 × 0.38 | 3 + 9 + 15 × 0.175 + 0.15 |
| Twist Factor | | 1316 | 1930 | 1364 | 1985 | | |
| Cord Gauge | mm | 0.56 | 0.58 | 1.01 | 1.04 | 1.16 | 1.05 |
| Strength | kg | 111.2 | 98.1 | 112.8 | 99.6 | 192.3 | 149.7 |
| Elongation @ Break | % | 4.1 | 5.4 | 5.3 | 5.3 | 1.7 | 1.7 |
| Dipped Cord | | | | | | | |
| Twist | T/10 cm | 72 × 72 | 72 × 72 | 72 × 72 | 72 × 72 | | |
| Twist Factor | | 1316 | 1930 | 1364 | 1985 | | |
| Cord Gauge | mm | 0.58 | 0.60 | 1.03 | 1.05 | | |
| Strength | kg | 105.5 | 92.3 | 98.1 | 86.5 | | |
| Strength Factor | kg/mm$^2$ | 313.6 | 256.4 | 92.5 | 78.5 | | |
| Elongation @ Break | % | 3.7 | 4.3 | 4.2 | 4.2 | | |
| Hot Air Shrinkage | % | 0.0 | 0.0 | 0.0 | 0.0 | | |

TABLE V

|  |  | Tire 1 | Tire 2 | Comparative 1 | Comparative 2 | Comparative 3 |
| --- | --- | --- | --- | --- | --- | --- |
| Belt Material |  | H | L | J | L | L |
| Carcass Material |  | I | I | K | K | M |
| Tire Weight | kg | 41.6 | 45.3 | 47.0 | 50.2 | 53.8 |
| Strength of Carcass Cord | kg | 107.0 | 92.6 | 99.4 | 85.7 | 149.2 |
| High Speed Durability | index | 105 | 106 | 99 | 102 | 100 |
| Load Durability | index | 101 | 105 | 95 | 97 | 100 |
| Rolling Resistance | index | 81 | 83 | 90 | 88 | 100 |
| Riding Feeling | index | 115 | 110 | 115 | 109 | 100 |
| Cornering Power | index | 100 | 103 | 95 | 96 | 100 |
| Fuel Consumption | index | 85 | 89 | 93 | 95 | 100 |

What is claimed is:

1. A tire comprising polybenzoxazole fibers having voids with an average void diameter of 25 Å or less, incorporated into reinforcing belts in said tire.

2. The tire of claim 1 in which said polybenzoxazole fibers are characterized in that they have:

(a) a tensile strength of at least 4.0 GPa; and
(b) a tensile modulus of at least 140 GPa.

3. The tire of claim 1, wherein said polybenzoxazole fibers are also incorporated into the carcass of said tire.

4. A tire comprising polybenzoxazole fibers having voids with an average void diameter of 25 Å or less, incorporated into the carcass of said tire.

* * * * *